(12) United States Patent
Shen et al.

(10) Patent No.: US 8,056,938 B2
(45) Date of Patent: Nov. 15, 2011

(54) FITTING FOR CORRUGATED CONDUIT

(75) Inventors: James Shen, Toronto (CA); Lorne Smyth, Orangeville (CA); John Kehren, Newmarket (CA)

(73) Assignee: Royal Group Inc., Woodbridge (CA)

( * ) Notice: Subject to any disclaimer, the term of this patent is extended or adjusted under 35 U.S.C. 154(b) by 31 days.

(21) Appl. No.: 12/424,844

(22) Filed: Apr. 16, 2009

(65) Prior Publication Data

US 2010/0264644 A1 Oct. 21, 2010

(51) Int. Cl.
*F16L 21/06* (2006.01)
(52) U.S. Cl. .................. 285/321; 285/322; 285/903
(58) Field of Classification Search .............. 285/903, 285/149.1, 305, 321, 322
See application file for complete search history.

(56) References Cited

U.S. PATENT DOCUMENTS

| | | | |
|---|---|---|---|
| 4,368,904 A | 1/1983 | Lanz | |
| 4,440,425 A * | 4/1984 | Pate et al. ................. | 285/149.1 |
| 4,441,745 A * | 4/1984 | Nicholas ................... | 285/903 |
| 4,647,074 A * | 3/1987 | Pate et al. ................. | 285/903 |
| 4,711,472 A * | 12/1987 | Schnell .................... | 285/149.1 |
| 4,711,974 A | 12/1987 | Borsh | |
| 4,723,796 A | 2/1988 | Nattel | |
| 4,836,580 A | 6/1989 | Farrell | |
| 4,864,080 A | 9/1989 | Fochler et al. | |
| 4,989,905 A | 2/1991 | Rajecki | |
| 5,112,086 A * | 5/1992 | Gruber et al. ............ | 285/903 |
| 5,204,499 A * | 4/1993 | Favalora .................. | 285/149.1 |
| 5,356,181 A * | 10/1994 | Shirogane et al. ........ | 285/903 |
| 5,362,112 A | 11/1994 | Hamilton et al. | |
| 5,407,236 A * | 4/1995 | Schwarz et al. .......... | 285/903 |
| 5,730,474 A | 3/1998 | Bank | |
| 5,799,988 A * | 9/1998 | Yeh .......................... | 285/903 |
| D418,210 S | 12/1999 | Roesch | |
| 6,199,918 B1 * | 3/2001 | Gerich ..................... | 285/903 |
| 6,199,920 B1 * | 3/2001 | Neustadtl ................. | 285/903 |
| 6,435,567 B2 * | 8/2002 | Kikumori et al. ........ | 285/903 |
| 6,733,046 B1 * | 5/2004 | Rief ......................... | 285/903 |
| 6,739,630 B2 | 5/2004 | Riedy | |
| 6,899,354 B2 | 5/2005 | Lanteigne et al. | |
| 6,918,618 B2 | 7/2005 | Allouche | |
| 7,100,950 B2 * | 9/2006 | Martin ..................... | 285/903 |

(Continued)

OTHER PUBLICATIONS

Royal Pipe Systems; Royal Flex ENT & Fittings; Catalog, May 2004, 12 pages, Canada.

US Design U.S. Appl. No. 29/338,058, filed Jun. 3, 2009; Title: Conduit Fitting Body.

(Continued)

*Primary Examiner* — David E Bochna
(74) *Attorney, Agent, or Firm* — Osler, Hoskin & Harcourt LLP (57) ABSTRACT

A fitting for joining a corrugated conduit to a structure associated therewith is disclosed. The fitting comprises a hollow body having an inner chamber and at least two body resilient tabs extending from an end. The at least two body resilient tabs define at least two body gaps therebetween. Each of the at least two body resilient tabs defines an outwardly extending detent. The fitting also comprises a retaining ring including a flange and at least two ring resilient tabs extending from the flange and defining ring gaps therebetween. Each of the at least two ring resilient tabs defines an inwardly extending detent adapted to engage a corrugated conduit. Each of the at least two body resilient tabs is selectively inserted in a corresponding one of the at least two ring gaps, and the outwardly extending detents selectively engage an end of the flange of the retaining ring.

21 Claims, 10 Drawing Sheets

U.S. PATENT DOCUMENTS

| | | |
|---|---|---|
| 7,186,915 B2 | 3/2007 | Hull et al. |
| D544,448 S | 6/2007 | Hull et al. |
| 7,387,288 B2 | 6/2008 | Hull et al. |
| 7,614,664 B1 * | 11/2009 | Tsai ............................ 285/903 |

OTHER PUBLICATIONS

US Design U.S. Appl. No. 29/338,056, filed Jun. 3, 2009; Title: Conduit Fitting Ring.

* cited by examiner

FITTING FOR CORRUGATED CONDUIT

FIELD OF THE INVENTION

The present invention relates to a fitting for connecting a corrugated conduit to an associated structure.

BACKGROUND OF THE INVENTION

Corrugated and non-corrugated thermoplastic tubings are widely used as conduits for protecting wiring cables extending between various control boxes, switch boxes, and the like. Conventionally, to facilitate the installation and use of such tubing, push together or "snap together" type connectors have been used to allow tubing sections to be joined to each other or to system components quickly and without requiring special tools or adhesives.

Different connector designs have been proposed for this purpose. These prior connector designs have varied from simple one piece type connectors using resilient tabs or fingers to more complex multi-component designs using multiple rings or other internal connector elements.

U.S. Pat. No. 4,836,580 (the '580 patent) discloses one such design. The '580 patent discloses a connection device for use in securing an end of a corrugated pipe to a fitting such as a terminal box connector or to be used as a pipe-to-pipe coupling. The connection device of the '580 patent includes an annular ring having an array of fingers extending axially therefrom, for insertion into a fitting body. The fitting body has apertures therein. In practice, a user first inserts the corrugated pipe into the annular ring and then begins to introduce the fingers of the annular ring and the corrugated pipe into the fitting body. However, because of the configuration of both the fingers of the annular ring and the fitting body, the fingers are concealed to the user when the user begins to introduce the fingers of the annular ring into the fitting body, thereby preventing the user to accurately control the alignment of the fingers with the apertures of the fitting.

There is therefore a need in the art for a fitting for easily connecting a corrugated tubing to an associated structure.

SUMMARY OF THE INVENTION

It is an object of the present invention to improve at least some of the inconveniences present in the prior art.

It is also an object of the present invention to provide a fitting for corrugated conduit.

In one aspect, the present invention provides a fitting for joining a corrugated conduit to a structure associated with the fitting. The fitting has a generally cylindrical hollow body having an inner chamber defined therein and at least two body resilient tabs extending from an end of the fitting body in an axial direction of the fitting body. The at least two body resilient tabs define at least two body gaps therebetween and each of the at least two body resilient tabs defines an outwardly extending detent. The fitting also has a retaining ring including a flange, and at least two ring resilient tabs extending from the flange. The at least two ring resilient tabs define at least two ring gaps therebetween. Each of the at least two ring resilient tabs defines an inwardly extending detent adapted to engage a corrugation of the corrugated conduit. Each of the at least two body resilient tabs is selectively inserted in a corresponding one of the at least two ring gaps, and the outwardly extending detents selectively engage an end of the flange of the retaining ring.

In a further aspect, the fitting body includes a radially inwardly extending wall adapted to abut an end of the corrugated conduit when the fitting body, the retaining ring, and the corrugated conduit are engaged together.

In a further aspect, the at least two ring resilient tabs extend from the flange in an axial direction of the flange.

In a further aspect, the at least two body resilient tabs are arranged in diametrically opposed sets.

In a further aspect, the at least two ring resilient tabs are arranged in diametrically opposed sets.

In another aspect, each of the outwardly extending detents of the at least two body resilient tabs extends radially outwardly away from its corresponding body resilient tab.

In another aspect, each of the inwardly extending detents of the at least two ring resilient tabs extends radially inwardly away from its corresponding ring resilient tab.

In yet another aspect, each of the at least two body resilient tabs includes an outwardly extending wall, the retaining ring being selectively disposed between the outwardly extending detents and the outwardly extending walls.

In yet another aspect, each of the outwardly extending walls extends radially outwardly away from its corresponding body resilient tab.

In another aspect, a connecting portion for connection to an associated structure extends from an other end of the fitting body in the axial direction of the fitting body, the connecting portion defining at least two connecting portion detents extending outwardly from the connecting portion.

In yet another aspect, the associated structure is one of a slab box, a control box, and a switch box.

In another aspect, at least two other body resilient tabs extend from another end of the fitting body in the axial direction of the fitting body, the at least two other body resilient tabs defining at least two body gaps therebetween, each of the at least two other body resilient tabs defining an outwardly extending detent.

In another aspect, the retaining ring is a first retaining ring adapted to engage a first corrugated conduit. The fitting also has a second retaining ring. The second retaining ring includes a flange, and at least two ring resilient tabs extending from the flange. The at least two ring resilient tabs define at least two ring gaps therebetween. Each of the at least two ring resilient tabs defines an inwardly extending detent adapted to engage a corrugation of a second corrugated conduit.

In another aspect, each of the at least two other body resilient tabs are selectively inserted in a corresponding one of the at least two ring gaps of the second retaining ring, and the outwardly extending detents of the at least two other body resilient tabs selectively engaging an end of the flange of the second retaining ring.

In yet another aspect, the first and second corrugated conduits abut the radially inwardly extending wall disposed in the inner chamber when the fitting body, the first and second retaining rings, and the first and second corrugated conduits are engaged together.

In yet another aspect, the present invention provides a retaining ring for joining a corrugated conduit to a generally cylindrical hollow fitting body. The retaining ring has a flange having an axial direction and an inwardly facing surface, the inwardly facing surface being inclined with respect to the axial direction, and at least two ring resilient tabs extending from the flange. The at least two ring resilient tabs define at least two ring gaps therebetween. Each of the at least two ring resilient tabs defines inwardly extending detent adapted to engage a corrugation of the corrugated conduit.

In yet another aspect, the flange has at least two indentations defined between the at least two ring resilient tabs.

In another aspect, the present invention provides a fitting body for engaging a retaining ring having a corrugated conduit retained therein. The fitting body has a generally cylindrical hollow body having an inner chamber defined therein, and at least two body resilient tabs extending from an end of the fitting body in an axial direction of the fitting body. The at least two body resilient tabs define at least two body gaps therebetween. Each of the at least two body resilient tabs has an outwardly extending detent.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Referring to the drawings and initially to FIGS. 1-6, a fitting for joining a corrugated conduit to a structure associated with the fitting in accordance with the present invention will be described. The fitting comprises a generally cylindrical hollow fitting body 10 and retaining rings 30.

The fitting body 10 is made of injection-molded PVC and the retaining ring 30 is made of polycarbonate. A fitting body and a retaining ring made of injection-molded ABS plastic or of any other suitable plastic material such as polycarbonate, and polypropylene are also contemplated.

Figure 1:
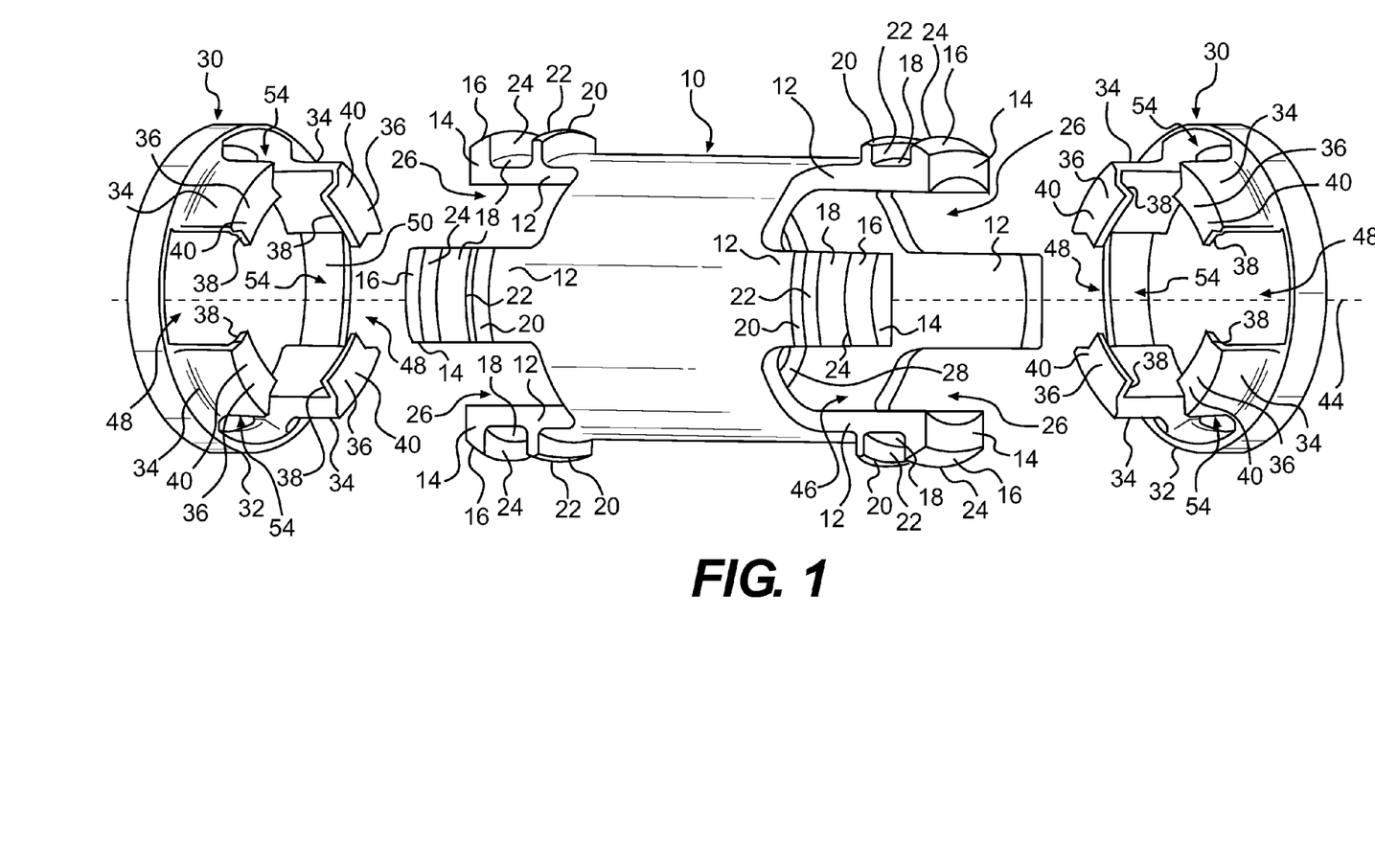
FIG. 1 is a perspective view of a fitting body and two retaining rings in accordance with the present invention, the two retaining rings being disconnected from the fitting body.
Figure 2:
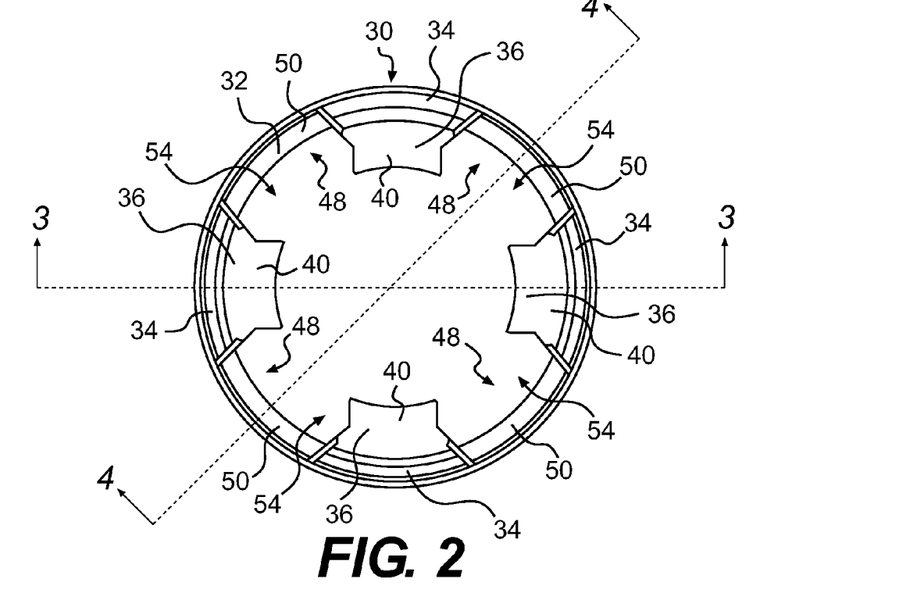
FIG. 2 is an end view of one of the retaining rings of FIG. 1.
Figures 3, 4:
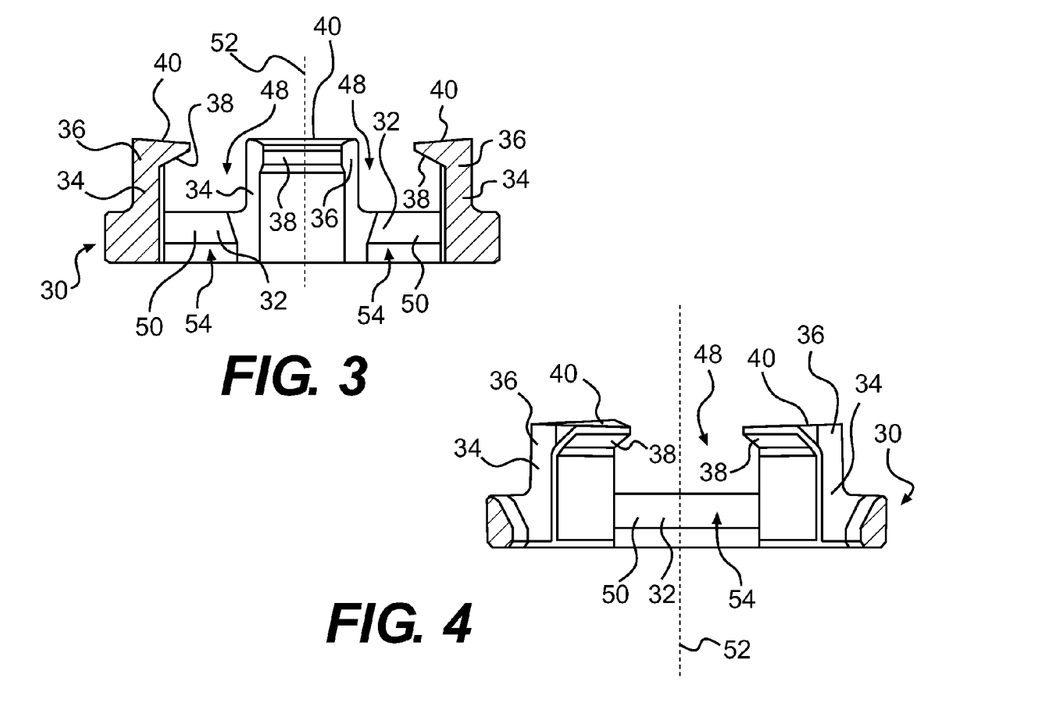
FIG. 3 is a cross-sectional view of the retaining ring of FIG. 2 taken along the line 3-3 in FIG. 2.
FIG. 4 is a cross-sectional view of the retaining ring of FIG. 2 taken along the line 4-4 in FIG. 2.
Figure 5:
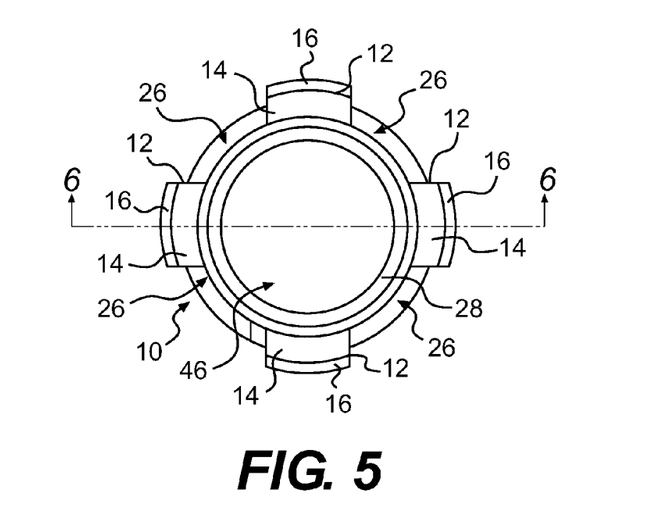
FIG. 5 is an end view of the fitting body of FIG. 1.
Figure 6:
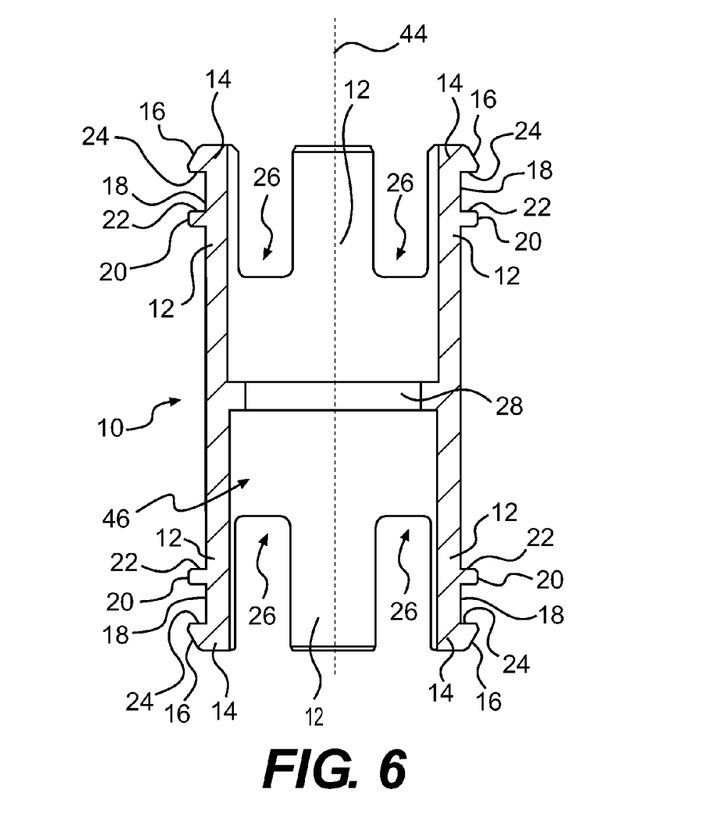
FIG. 6 is a cross-sectional view of the fitting body of FIG. 5 taken along the line 6-6 in FIG. 5.

As shown on FIGS. 1, 5, and 6, the fitting body 10 defines an inner chamber 46 therein and comprises body resilient tabs 12 extending from each end of the fitting body 10 in an axial direction of the fitting body 10 (i.e. in a direction parallel to a central axis 44). The body resilient tabs 12 are arranged in diametrically opposed sets and define body gaps 26 therebetween. As best shown on FIG. 6, each of the body resilient tabs 12 defines an outwardly extending detent 14. Each of the outwardly extending detents 14 extends radially outwardly away from its corresponding body resilient tab 12. Each of the outwardly extending detent 14 comprises a retaining surface 24 and an outwardly facing surface 16. The outwardly facing surface 16 is inclined with respect to the axial direction of the fitting body 10 in a manner to provide a radially inwardly directed force to the associated body resilient tabs 12 when the fitting body is inserted in a retaining ring 30. Each of the body resilient tabs 12 includes an outwardly extending wall 20 having a retaining surface 22. The outwardly extending wall 20 extends radially outwardly away from its corresponding body resilient tab 12 thereby forming a space 18 between the retaining surface 24 and the retaining surface 22. The fitting body 10 further comprises a radially inwardly extending wall 28 located in the inner chamber 46 (see FIGS. 5 and 6). The radially inwardly extending wall 28 is positioned at the middle of the inner chamber 46 so as to be equidistant from the ends of the fitting body 10. The fitting body is symmetric about the radially inwardly extending wall 28.

A fitting body including body resilient tabs extending from one end of the fitting body only, as shown in FIGS. 9-11 and 12, a fitting body having two body resilient tabs only at each end, a fitting body having more than two body resilient tabs at each end, and a fitting body wherein the radially inwardly extending wall is omitted, are also contemplated.

Referring now to FIGS. 1-4, one retaining ring 30 will be described. The other retaining ring 30 is same and therefore will not be described. The retaining ring 30 comprises a flange 32 having an axial direction of the retaining ring 30 (i.e. in a direction parallel to a central axis 52) and an inwardly facing surface 50. The retaining ring 30 also includes ring resilient tabs 34 extending from the flange 32 so as to define ring gaps 48 therebetween. The inwardly facing surface 50 is inclined with respect to the axial direction of the flange 32 in a manner to provide a radially outwardly directed force to the flange 32 of the retaining ring 30 when the body resilient tabs 12 of the fitting body 10 are inserted in the retaining ring 30. In an embodiment of the present invention, the ring resilient tabs 34 are arranged in diametrically opposed sets. The ring resilient tabs 34 extend from the flange 32 in the axial direction of the flange 32 and define indentations 54 therebetween. As best shown on FIG. 4, each of the resilient tabs 34 defines an inwardly extending detent 36. Each of the inwardly extending detents 36 extends radially inwardly away from its corresponding ring resilient tab 34. Each of the inwardly extending detents 36 comprises a retaining surface 40 and an inwardly facing surface 38. The inwardly facing surface 38 is inclined in a manner to provide a radially outwardly directed force to the associated ring resilient tabs 34 when a corrugated conduit 42 (see FIGS. 7 and 8) is inserted in the retaining ring 30.

A retaining ring including ring resilient tabs inclined towards a centerline of the retaining ring so as to define detents, a retaining ring having two ring resilient tabs only, and a retaining ring having more than two ring resilient tabs, are also contemplated.

In practice, a user aligns a corrugated conduit 42 having an outer surface with the central axis 52 of the flange 32 of the retaining ring 30. Then, the user inserts an end of the corrugated conduit 42 into the retaining ring 30. As the tubing is being inserted, the outer surface of the corrugated conduit 42 bends the ring resilient tabs 34 outwardly thereby allowing the user to translate the retaining ring 30 along the corrugated conduit 42. The user selects the corrugation of the corrugated conduit 42 on which the retaining ring 30 is engaged such that, when the fitting body 10, the retaining ring 30 and the corrugated conduit 42 are engaged together, the end of the corrugated conduit 42 abuts the radially inwardly extending wall 28 of the inner chamber 46. When the inwardly extending detents 36 engage a corrugation of the corrugated conduit 42, the retaining surfaces 40 of the inwardly extending detents 36 prevent the corrugated conduit 42 to be translated in a direction opposite to the direction in which the corrugated conduit 42 has been inserted into the retaining ring 30.

Once the retaining ring 30 is positioned on the corrugated conduit 42, the user then introduces the end of the corrugated conduit 42 on which the retaining ring 30 is engaged in the inner chamber 46 of the fitting body 10 until the retaining ring 30 snaps the body resilient tabs 12 of the fitting body 10. To do so, the user aligns the fitting body 10 and the corrugated conduit 42 on which the retaining ring 30 is engaged, along the central axis 44 of the fitting body 10, such that each of the body resilient tabs 12 of the fitting body 10 is inserted in a corresponding one of the ring gaps 48. The user inserts the end of the corrugated conduit 42 into the fitting body and pushes the retaining ring 30 towards the fitting body 10 along the central axis 44. The inwardly facing surface 50 of the flange 32 of the retaining ring 30 pushes against the outwardly facing surfaces 16 of the outwardly extending detents 14 of the body resilient tabs 12 causing the body resilient tabs 12 to bend inwardly. The user continues to push the retaining ring 30 towards the fitting body 10 until the body resilient tabs 12 and the flange 32 snap back such that the flange 32 is held in place in the space 18 of the fitting body 10, as shown in FIG. 8.

Figure 7:
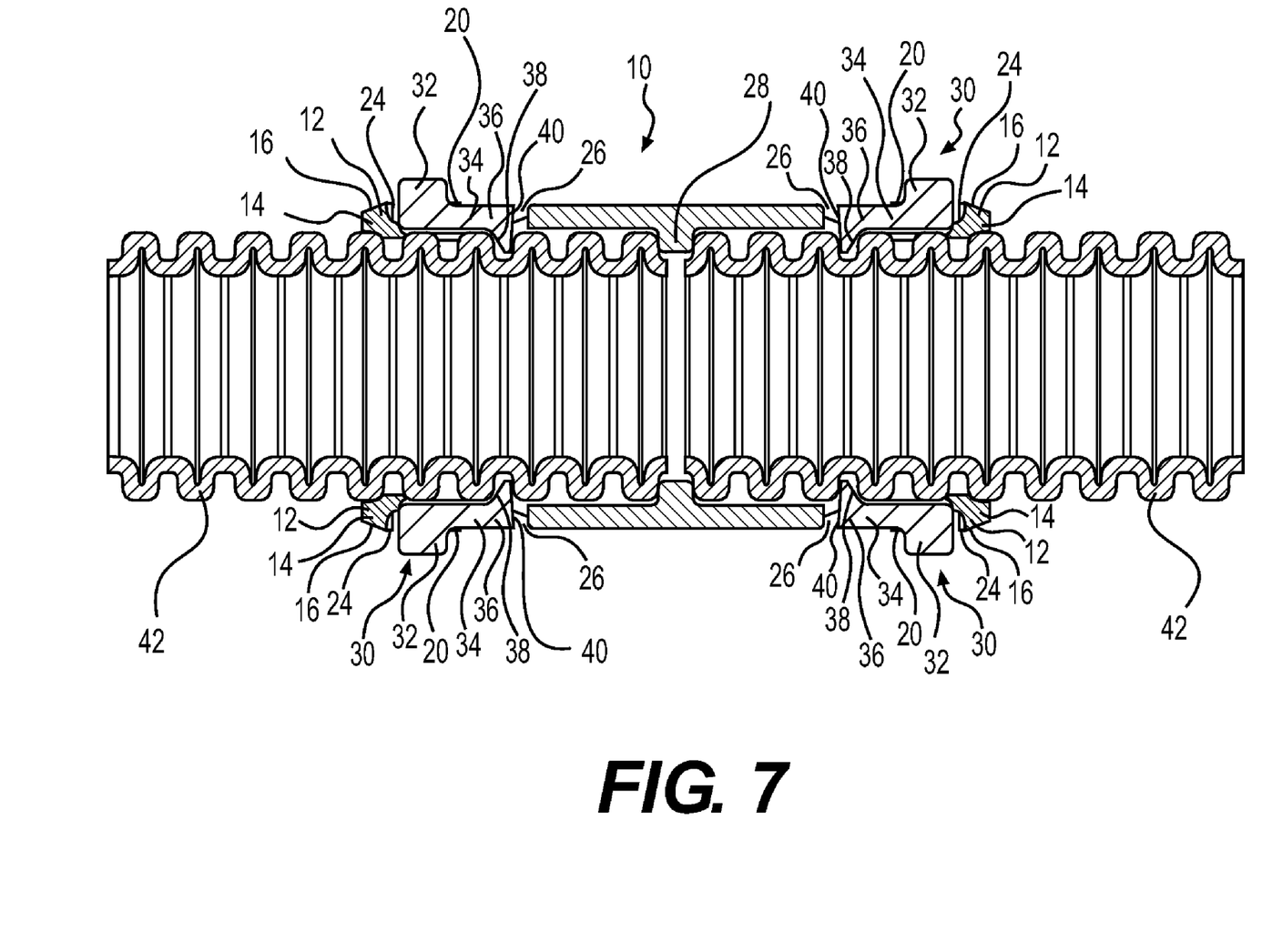
FIG. 7 is a cross-sectional view of two corrugated conduits connected together with the fitting body and the two retaining rings of FIG. 1.

As shown in FIG. 7, when the fitting body 10, the retaining ring 30 and the corrugated conduit 42 are engaged together, the end of the corrugated conduit 42 preferably abuts the radially inwardly extending wall 28. Alternatively, it is contemplated that the end of the corrugated conduit 42 could also be spaced apart from the radially inwardly extending wall 28 when the fitting body 10, the retaining ring 30 and the corrugated conduit 42 are engaged together.

Figure 8:
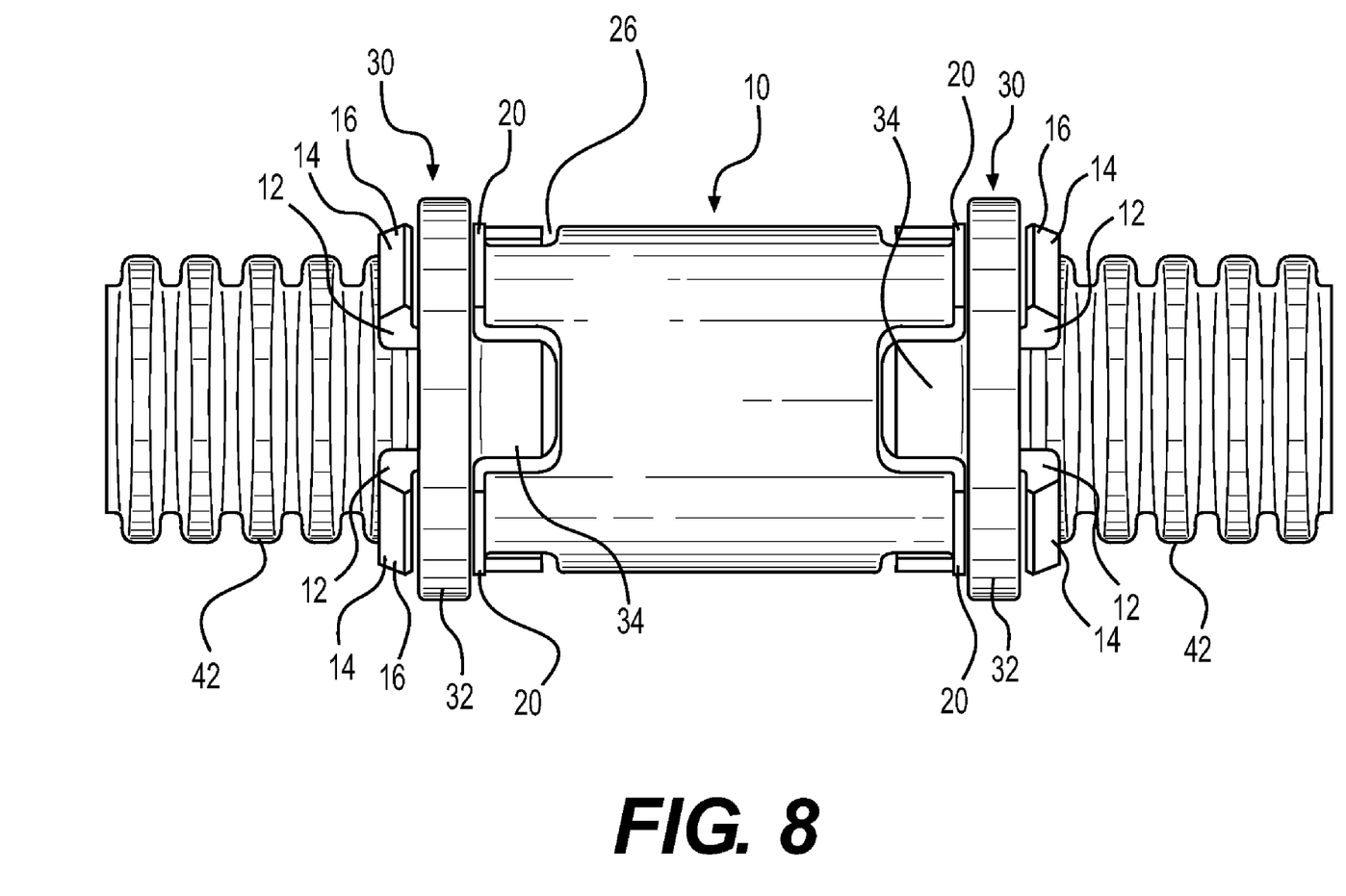
FIG. 8 is a side view thereof.

As shown in FIG. 8, when the fitting body 10, the retaining ring 30 and the corrugated conduit 42 are engaged together, the body resilient tabs 12 are inserted in a corresponding one of the ring gaps 48 and the ring resilient tabs 34 are inserted in a corresponding one of the body gaps 18.

Also, when the fitting body 10, the retaining ring 30 and the corrugated conduit 42 are engaged together, the outwardly extending detents 14 of the body resilient tabs 12 engage an end of the flange 32 of the retaining ring 30. The flange 32 is disposed between the retaining surfaces 24 of the outwardly extending detents 14 and the retaining surfaces 22 of the outwardly extending walls 20 of the body resilient tabs 12, thereby preventing the retaining ring 30 and the corrugated conduit 42 to be disconnected from the fitting body 10.

As shown in FIGS. 1, and 5-8, the fitting joins together first and second corrugated conduits 42. To do so, the user inserts the second corrugated conduit 42 in the other end of the fitting body 10 and engages the second corrugated conduit 42 with the fitting body 10 by using an other retaining ring 30, in the manner described above.

Figure 9:
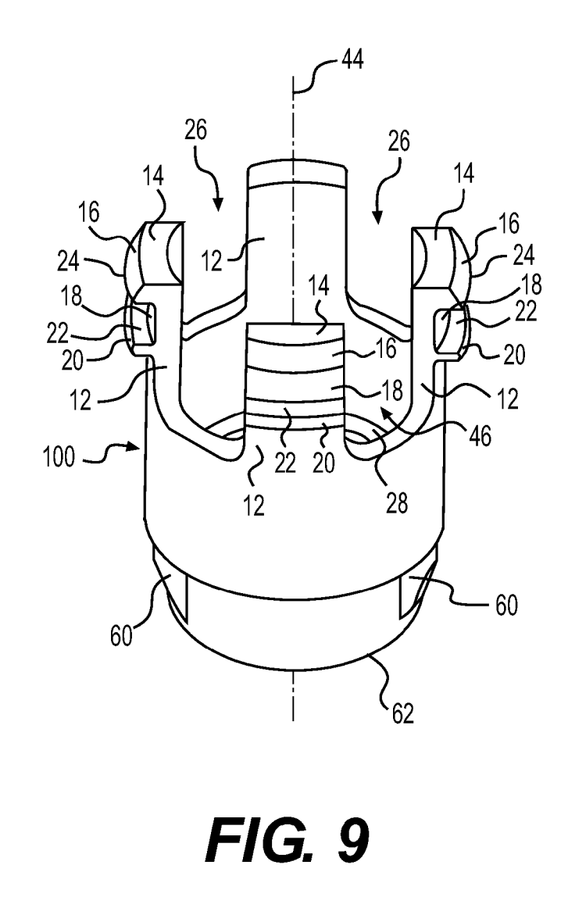
FIG. 9 is a perspective view of a fitting body according to an alternative embodiment.
Figure 10:
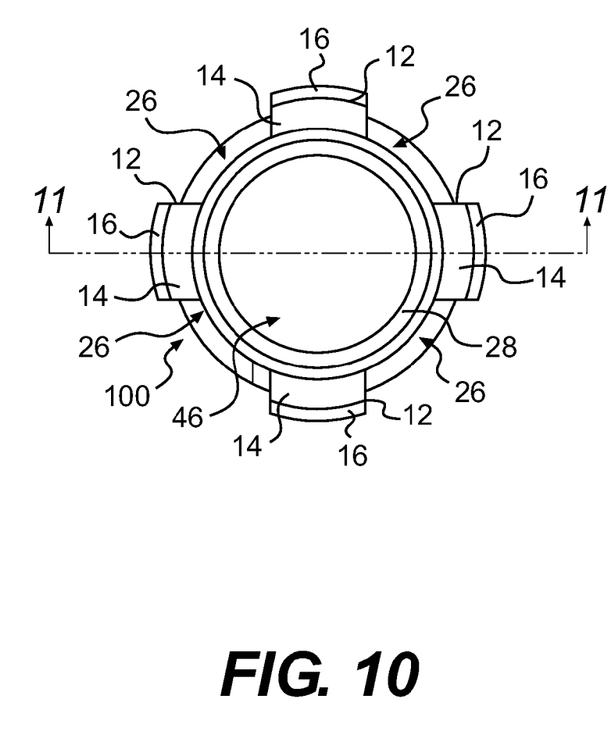
FIG. 10 is an end view of the fitting body of FIG. 9.
Figure 11:
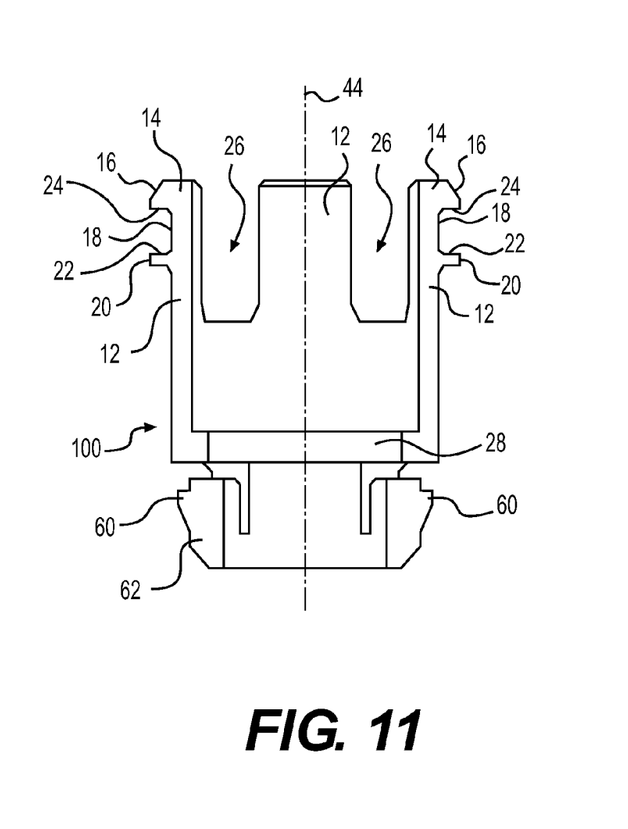
FIG. 11 is a cross-sectional view of the fitting body of FIG. 9 taken along the line 11-11 in FIG. 10.

Although the preferred embodiment is directed to a fitting for joining together a first and a second corrugated conduits, it should be understood that a fitting for joining a corrugated conduit to any associated structure is within the scope of the present invention. An example of such alternative embodiment is shown in FIGS. 9-11. The fitting body 100 shown in FIGS. 9-11 has body resilient tabs 12 similar to those described above extending from a first end in an axial direction of the fitting body 100 (i.e. in a direction parallel to a central axis 44). The fitting body 100 also comprises a connecting portion 62 extending from a second end, opposite to the first end, for connection to an associated structure. The connecting portion 62 includes connecting portion detents 60 extending outwardly therefrom. In practice, the user inserts the connecting portion 62 into a receiving aperture in the associated structure. The user then pushes the fitting body 100 towards the associated structure until connecting portion detents 60 snap back such that the fitting body 100 is held in place in the aperture in the associated structure.

Although a fitting body 100 having a connecting portion 62 is shown in FIGS. 9-11, it is also contemplated that the connecting portion of the fitting body could be omitted and that the fitting body could be integrally formed with the associated structure.

Figure 12:
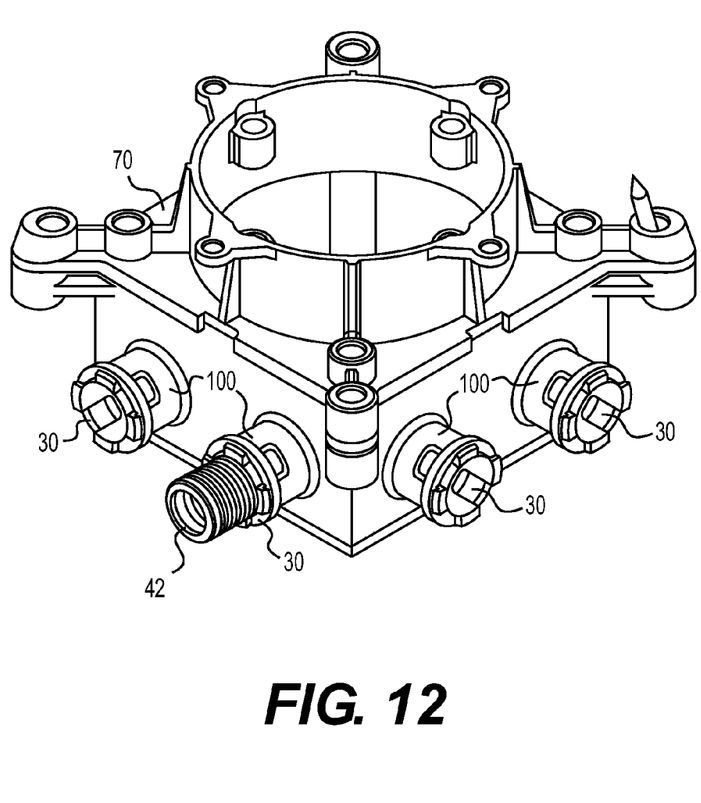
FIG. 12 is a perspective view of a slab box with fitting bodies mounted thereon, retaining rings connected to the fitting bodies and a corrugated pipe with a retaining ring inserted thereon connected to one of the fitting bodies.

In FIG. 12, an associated structure in the form of a slab box 70 is shown. The slab box 70 comprises fitting bodies 100 mounted thereon and retaining rings 30 connected to the fitting bodies 100. A corrugated pipe 42 with one of the retaining rings 30 inserted thereon is connected to one of the fitting bodies 100.

Although a slab box 70 is shown in FIG. 12, it is also contemplated that the associated structure could be one of a control box, a switch box, and the like.

Figure 13:
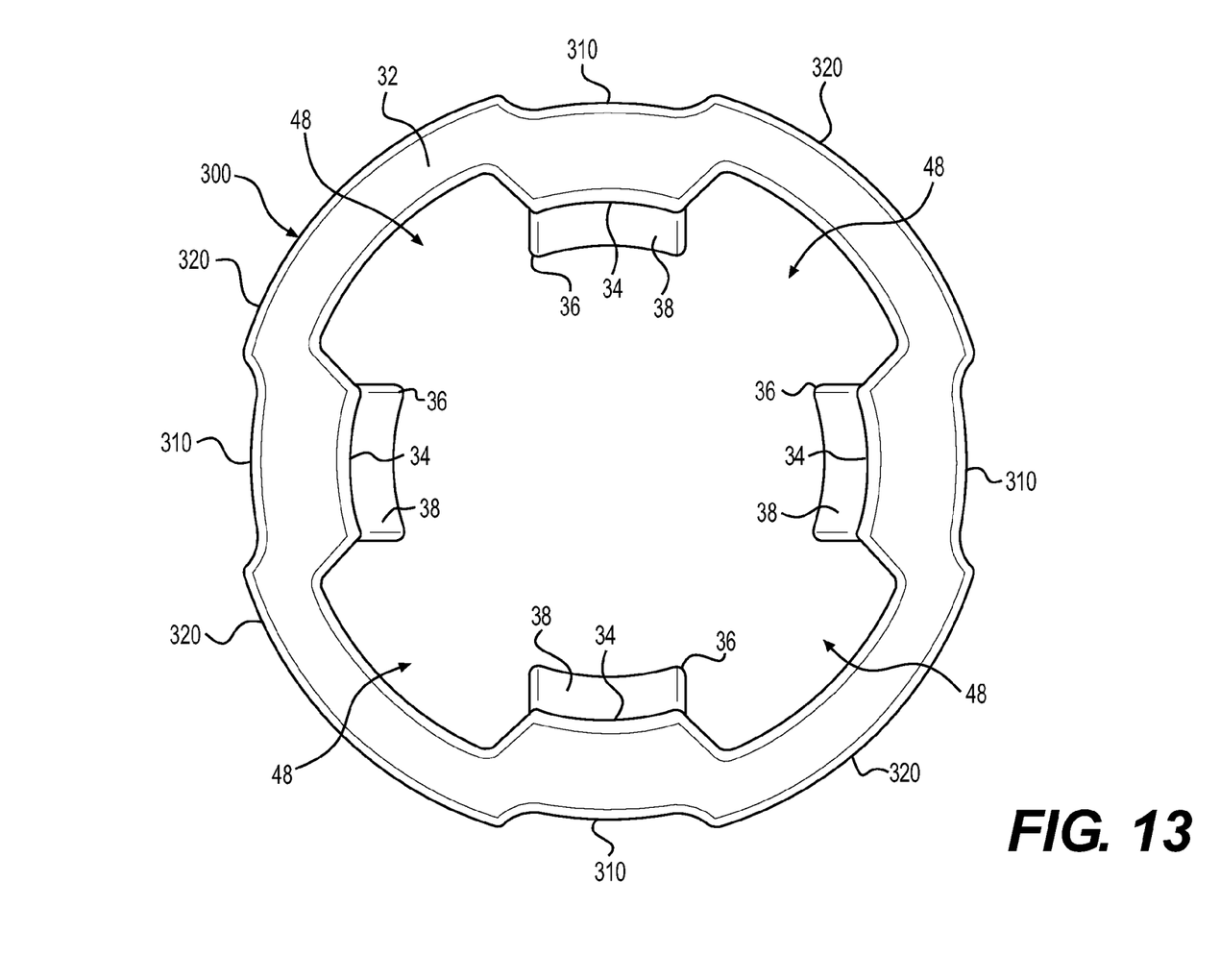
FIG. 13 is an end view of a retaining ring according to an alternative embodiment.
Figure 14:
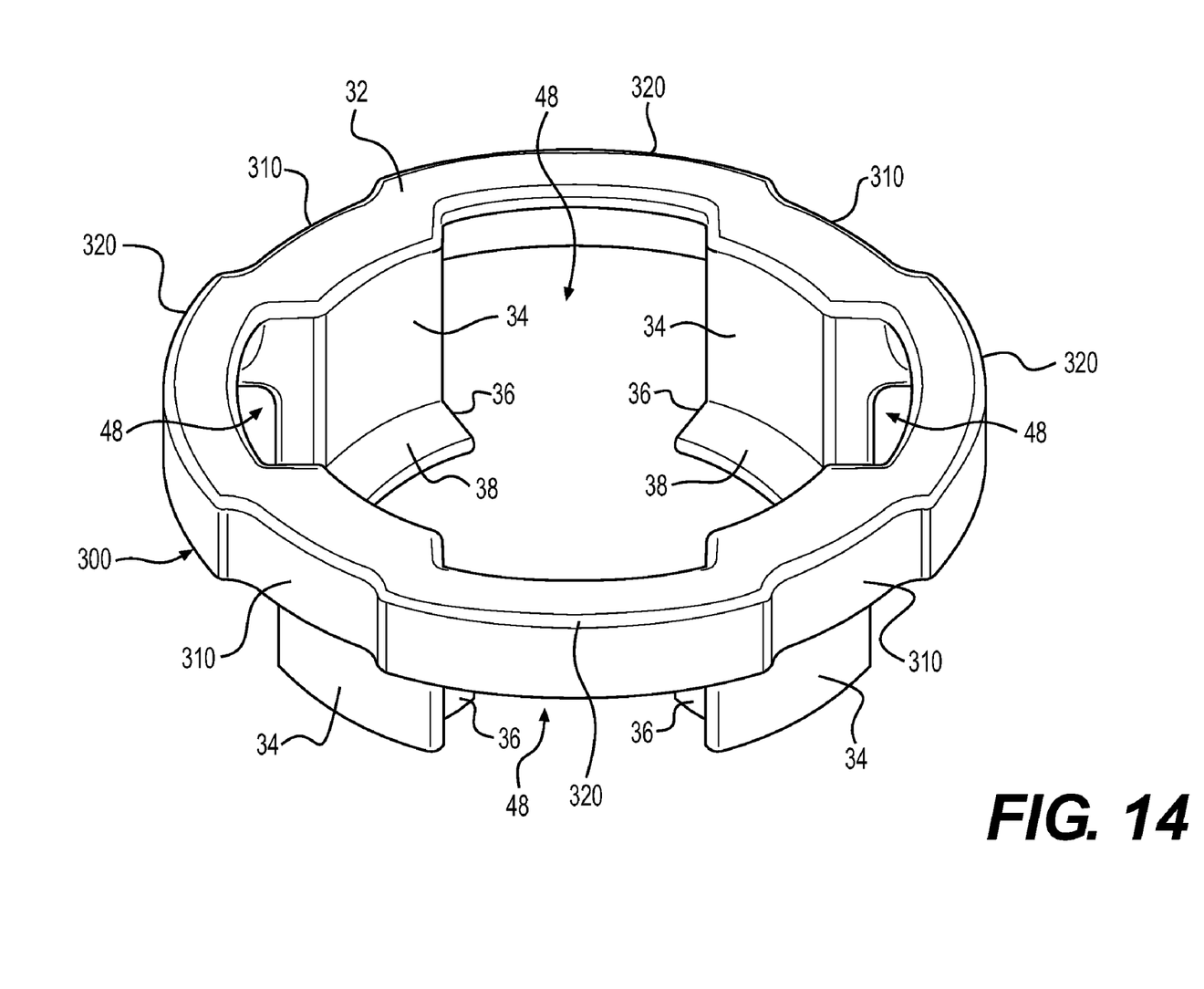
FIG. 14 is a perspective view of the retaining ring of FIG. 13.
Figure 15:
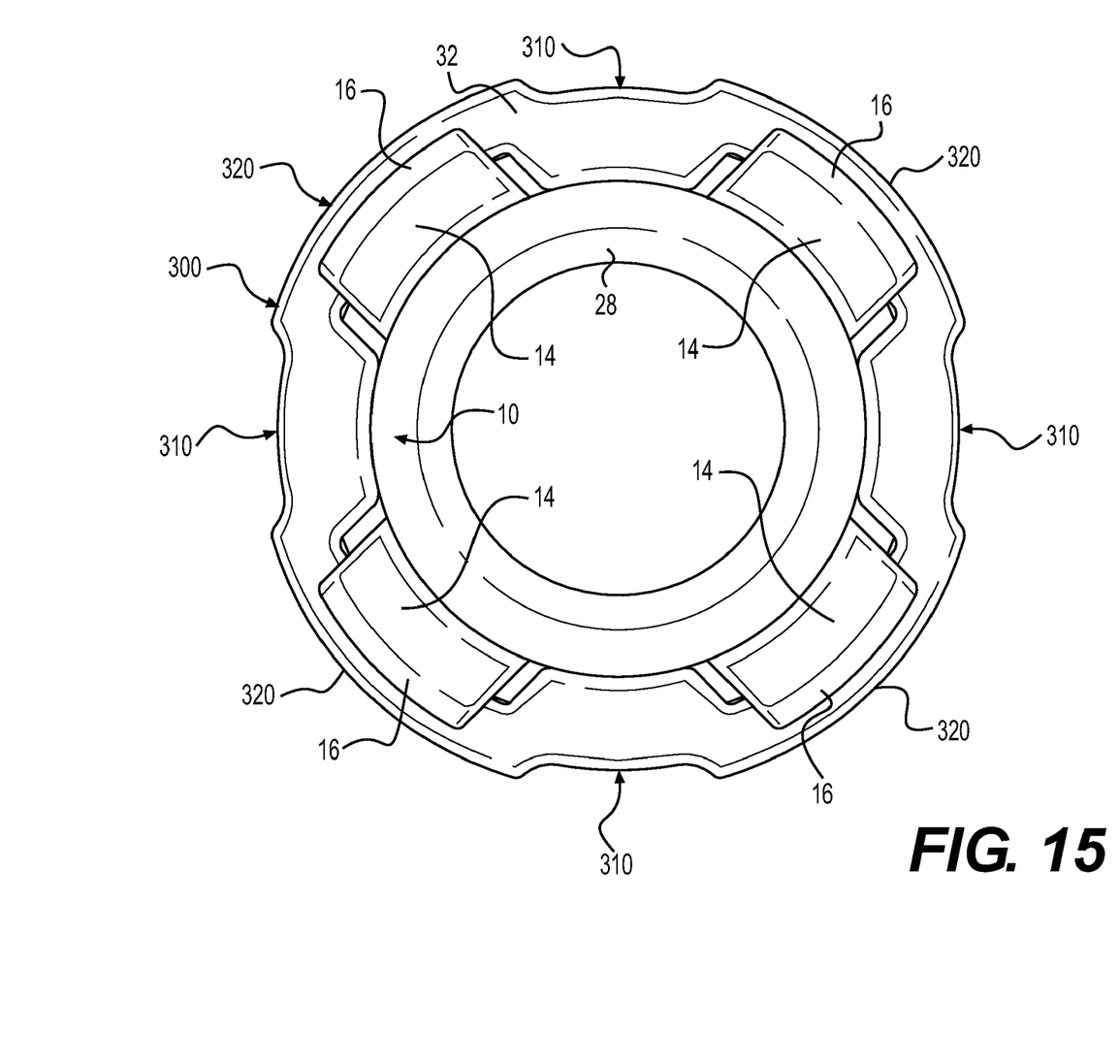
FIG. 15 is an end view of a fitting body with the retaining ring of FIG. 13 connected thereto.

Turning now to FIGS. 13 to 15, a second embodiment of a retaining ring, the retaining ring 300, will be described. For simplicity, features of the retaining ring 300 which are similar to those of the retaining ring 30 have been labeled with the same reference numerals and will not be described again in detail. The flange 32 of the retaining ring 300 comprises reinforcements 320 formed by increasing the thickness of the flange 32 between the resilient tabs 34. The reinforcements 320 extend outwardly of the flange 32 in a direction perpendicular to the axial direction of the flange 32 and define grooves 310 therebetween.

Although four reinforcements 320 are shown in FIGS. 13 to 15, a retaining ring having more or less reinforcements is also contemplated.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A fitting for joining a corrugated conduit to a structure associated with the fitting comprising:
   a generally cylindrical hollow body having an inner chamber defined therein;
   at least two body resilient tabs extending from an end of the fitting body in an axial direction of the fitting body, the at least two body resilient tabs defining at least two body gaps therebetween, each of the at least two body resilient tabs defining an outwardly extending detent; and
   a retaining ring including:
      a flange; and
      at least two ring resilient tabs extending from the flange, the at least two ring resilient tabs defining at least two ring gaps therebetween, each of the at least two ring resilient tabs defining an inwardly extending detent adapted to engage a corrugation of the corrugated conduit, each of the at least two body resilient tabs being selectively inserted in a corresponding one of the at least two ring gaps, and the outwardly extending detents selectively engaging an end of the flange of the retaining ring.

2. The fitting of claim 1, wherein the fitting body includes a radially inwardly extending wall adapted to abut an end of the corrugated conduit when the fitting body, the retaining ring, and the corrugated conduit are engaged together.

3. The fitting of claim 1, wherein the at least two ring resilient tabs extend from the flange in an axial direction of the flange.

4. The fitting of claim 1, wherein the at least two body resilient tabs are arranged in diametrically opposed sets.

5. The fitting of claim 1, wherein the at least two ring resilient tabs are arranged in diametrically opposed sets.

6. The fitting of claim 1, wherein each of the outwardly extending detents of the at least two body resilient tabs extends radially outwardly away from its corresponding body resilient tab.

7. The fitting of claim 1, wherein each of the inwardly extending detents of the at least two ring resilient tabs extends radially inwardly away from its corresponding ring resilient tab.

8. The fitting of claim 1, wherein each of the at least two body resilient tabs includes an outwardly extending wall, the retaining ring being selectively disposed between the outwardly extending detents and the outwardly extending walls.

9. The fitting of claim 8, wherein each of the outwardly extending walls extends radially outwardly away from its corresponding body resilient tab.

10. The fitting of claim 1, wherein a connecting portion for connection to an associated structure extends from an other end of the fitting body in the axial direction of the fitting body, the connecting portion defining at least two connecting portion detents extending outwardly from the connecting portion.

11. The fitting body of claim 10, wherein the associated structure is one of a slab box, a control box, and a switch box.

12. The fitting of claim 1, wherein at least two other body resilient tabs extend from an other end of the fitting body in the axial direction of the fitting body, the at least two other body resilient tabs defining at least two body gaps therebetween, each of the at least two other body resilient tabs defining an outwardly extending detent.

13. The fitting of claim 12, wherein the retaining ring is a first retaining ring adapted to engage a first corrugated conduit; and further comprising a second retaining ring, the second retaining ring including:

a flange; and at least two ring resilient tabs extending from the flange, the at least two ring resilient tabs defining at least two ring gaps therebetween, each of the at least two ring resilient tabs defining an inwardly extending detent adapted to engage a corrugation of a second corrugated conduit.

14. The fitting of claim 13, wherein each of the at least two other body resilient tabs are selectively inserted in a corresponding one of the at least two ring gaps of the second retaining ring, and the outwardly extending detents of the at least two other body resilient tabs selectively engaging an end of the flange of the second retaining ring.

15. The fitting of claim 14, wherein the first and second corrugated conduits abut a radially inwardly extending wall disposed in the inner chamber when the fitting body, the first and second retaining rings, and the first and second corrugated conduits are engaged together.

16. A retaining ring for joining a corrugated conduit to a generally cylindrical hollow fitting body, the retaining ring comprising:

a flange having an axial direction and an inwardly facing surface, the inwardly facing surface being inclined with respect to the axial direction; and at least two ring resilient tabs extending from the flange, the at least two ring resilient tabs defining at least two ring gaps therebetween, each of the at least two ring resilient tabs defining inwardly extending detent adapted to engage a corrugation of the corrugated conduit, each of the inwardly extending detents being disposed at a first end of its corresponding ring resilient tab, each of the at least two ring resilient tabs having a second end opposite its first end, each second end connecting its corresponding ring resilient tab to the flange.

17. The retaining ring of claim 16, wherein the at least two ring resilient tabs extend from the flange in the axial direction of the flange.

18. The retaining ring of claim 16, wherein the at least two ring resilient tabs are arranged in diametrically opposed sets.

19. The retaining ring of claim 16, wherein each of the inwardly extending detents of the at least two ring resilient tabs extends radially inwardly away from its corresponding ring resilient tab.

20. The retaining ring of claim 16, wherein the flange has at least two indentations defined between the at least two ring resilient tabs.

21. The retaining ring of claim 16, wherein the inwardly facing surface is disposed closer to the second ends of the at least two ring resilient tabs than to the first ends of the at least two ring resilient tabs in the axial direction of the flange.

* * * * *